No. 728,250. PATENTED MAY 19, 1903.
J. L. LARSON.
PLANT COVER.
APPLICATION FILED APR. 8, 1902.
NO MODEL.
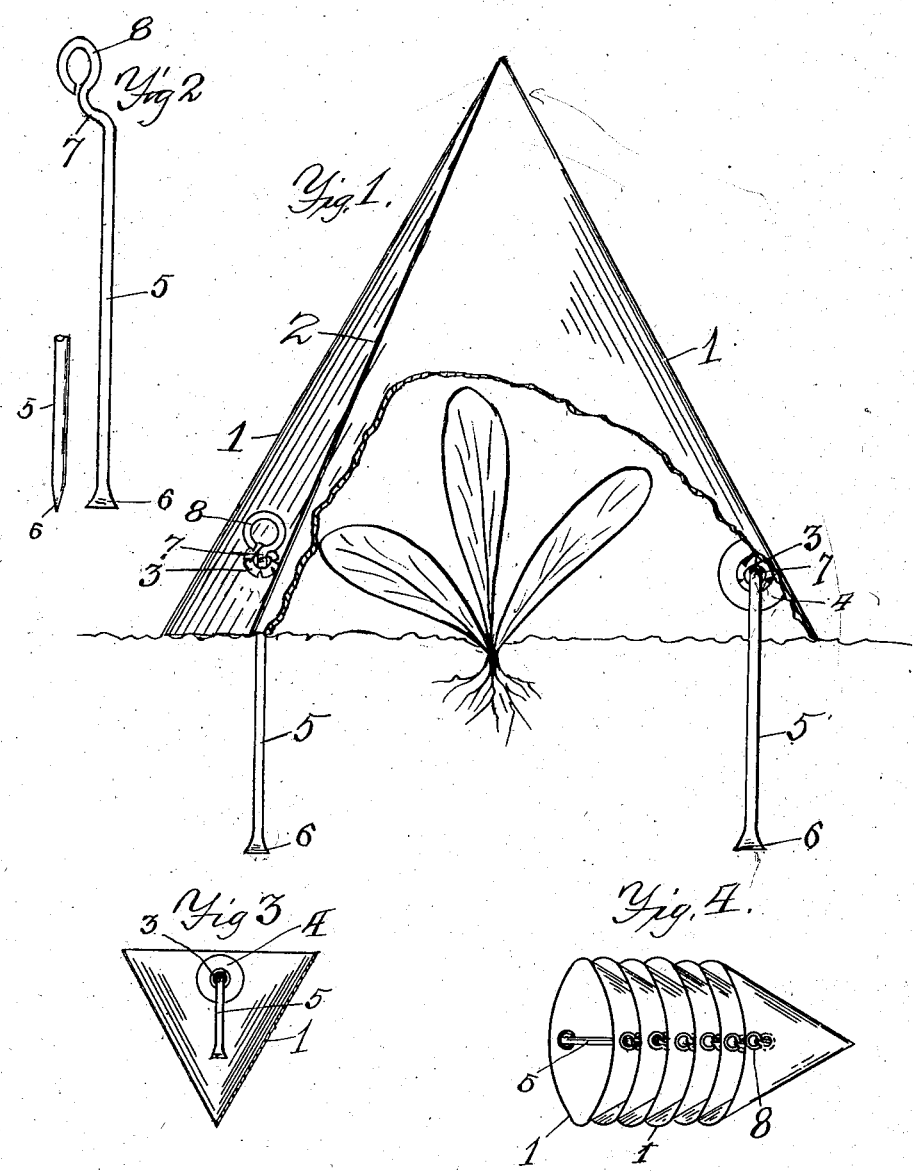
WITNESSES:
INVENTOR
John L. Larson
BY
J. Arthur Baldwin
ATTORNEY No. 728,250. Patented May 19, 1903.

UNITED STATES PATENT OFFICE.

JOHN L. LARSON, OF JAMESTOWN, NEW YORK.

PLANT-COVER.

SPECIFICATION forming part of Letters Patent No. 728,250, dated May 19, 1903.

Application filed April 8, 1902. Serial No. 101,956. (No model.)

*To all whom it may concern:*

Be it known that I, JOHN L. LARSON, a citizen of the United States, and a resident of Jamestown, in the county of Chautauqua and State of New York, have invented a new and useful Plant-Cover, of which the following, in connection with the accompanying drawings, is a full, clear, and exact description.

My invention relates to devices for protecting plants against low temperatures; and the object of my improvement is to make a cheap waterproof plant-cover which can be fastened securely to the ground by non-removable wire pegs, so that the wind cannot tip it over, which pegs are so made as to lie flat when inverted inside of the cones in order that they may be stacked together and a large number occupy small space.

In the drawings, Figure 1 is an elevation of my plant-cover fastened to the ground over a plant and with the side broken away. Fig. 2 is a detail of wire peg or pin. Fig. 3 is a sectional view of cover, showing peg inverted within the cone for stacking together; and Fig. 4 shows a series of covers set together or stacked.

Similar numerals refer to corresponding parts.

1 is my cone-shaped cover, which I usually make of some waterproof material like tar or rosin treated paper or any other cheap and light material which would serve the purpose. I cut this material in such a pattern that when folded together with edges lapping, as at 2, it shall form a cone-shaped cover. This lap can be fastened together in any suitable manner. I usually place the eyelet 3, through which wire peg 5 works, near the lower end of this lap both for strength of material and to hold the lap.

In some light materials where there is only a single thickness of material I strengthen it by attaching a piece like 4 and then place my eyelet in the center of piece 4.

Peg 5 is made with a ring 8 in one end, and next to the ring a peculiar offset or curve 7, which allows the peg to stand straight in the soil without displacing the side of cone 1, and also to lie flat in the cone when a number are inverted and inset together.

After the pegs 5 are inserted in eyelets 3 end 6 is flattened, as shown, so that the peg cannot be withdrawn or fall out of the eyelet and get lost, and also so that the pegs will drive easily. I have shown a cover with two pegs. One is often sufficient, and any number may be used with my cover.

To place my cover over a plant, it is grasped by the top of the cone and given a slight turn as it touches the ground to throw the pegs into shape for entering the earth. They are then quickly pressed down with a hand on each side where two pegs are used.

When the covers are removed, they are turned bottom up and the pegs automatically fall into place within the cone, which are then easily stacked, as shown.

In some parts of the country market gardeners have had trouble in so covering their plants as not to injure, and yet cover them securely, so that the strong night winds shall not make an entire loss of a season's work. My plant-cover meets this need in a simple, cheap, and safe manner.

I have chosen the cone shape for my cover on account of the ease with which it can be made and handled; but any other form of cover which I could secure to the ground with my pegs would serve my purpose.

I claim as new—

1. A cone-shaped plant-cover, openings in said cover near the lower edge, and wire pegs in said openings having an enlargement at each end.

2. A plant-cover consisting of a cone-shaped cover having eyelets therein, and wire pegs in said eyelets having offsets near their upper ends.

3. A plant-cover consisting of the cone 1 having the openings 3 therein, and pegs 5 having ends 6 and 8 and curve 7 to work in said openings, substantially as and for the purpose specified.

In testimony whereof I have signed my name to this specification in the presence of two subscribing witnesses.

JOHN L. LARSON.

Witnesses:
A. W. KETTLE,
S. A. BALDWIN.